(12) United States Patent
Lin

(10) Patent No.: US 6,546,846 B1
(45) Date of Patent: Apr. 15, 2003

(54) DEVICE FOR SENSING INTERNAL TEMPERATURE OF MEAT IN ROTISSERIE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/251,046

(22) Filed: Sep. 20, 2002

(51) Int. Cl.⁷ .................... A47J 37/00; A47J 37/04; A47J 43/00
(52) U.S. Cl. .............. 99/342; 99/343; 99/419; 99/421 TP; 374/155; 374/160
(58) Field of Search ............ 99/342–344, 419–421 V, 99/337, 338, 331; 374/155, 153, 158, 160, 117, 147, 208; 116/216–218, 281, 283, 101, 106; 294/907, 49, 55.5

(56) References Cited

U.S. PATENT DOCUMENTS

| | | | | |
|---|---|---|---|---|
| 2,132,095 A | * | 10/1938 | Broughton | 99/421 R |
| 2,189,123 A | * | 2/1940 | Barker | 374/160 |
| 3,075,454 A | * | 1/1963 | Henyan | 99/421 TP |
| 3,479,876 A | * | 11/1969 | Kliewer | 99/419 X |
| 3,511,167 A | * | 5/1970 | Holtkamp | 99/343 |
| 3,552,210 A | * | 1/1971 | Wright, Jr. | 374/155 X |
| 4,059,997 A | * | 11/1977 | Tott | 374/155 |
| 4,089,222 A | * | 5/1978 | Perkins | 99/344 |
| 4,237,731 A | * | 12/1980 | Dehn | 374/155 X |
| 4,381,439 A | * | 4/1983 | Miyazawa et al. | 99/421 TP |
| 5,312,188 A | * | 5/1994 | Ashe | 374/155 |
| 5,934,180 A | | 8/1999 | Lin | |
| 5,988,102 A | * | 11/1999 | Volk et al. | 116/218 |
| 6,131,505 A | | 10/2000 | Lin | |
| 6,412,398 B1 | * | 7/2002 | Norcross et al. | 99/342 |

* cited by examiner

Primary Examiner—Timothy F. Simone
(74) Attorney, Agent, or Firm—Alan Kamrath; Rider, Bennett, Egan & Arundel, LLP

(57) ABSTRACT

A device is mounted on a rotary spit of a rotisserie. The spit has an external handle at one end, a rod, and a connection member at the other end releasably coupled to a drive source. The device comprises temperature sensing elements on a central portion of the rod; and a thermometer on the handle, the thermometer having a sensing rod inserted into the handle to be conductive with the temperature sensing elements. After the rotisserie is activated, an internal temperature of a meat impaled by the rod being roasted is sensed by the temperature sensing elements. Next, the internal temperature of the meat is conveyed to the sensing rod from the temperature sensing elements so as to be indicated on the thermometer.

1 Claim, 6 Drawing Sheets

DEVICE FOR SENSING INTERNAL TEMPERATURE OF MEAT IN ROTISSERIE

FIELD OF THE INVENTION

The present invention relates to temperature measuring instruments and more particularly to a device for sensing internal temperature of an impaled meat in a rotisserie.

BACKGROUND OF THE INVENTION

A conventional electric roasting pan 10 is shown in FIG. 1. The roasting pan 10 comprises a lid 20 covered on it and an electric heating unit (not shown) inside the pan for roasting a meat put on the pan.

However, the prior art does not provide a means for informing a user about temperature especially internal temperature of the meat. Typically, the user either observes a color change of the meat or relies on his/her experience in determining whether the meat is well done. However, neither is reliable. Thus continuing improvements in this field are constantly being sought.

SUMMARY OF THE INVENTION

It is therefore an object of the present invention to provide a device mounted on a rotary spit of a rotisserie, the spit having an external handle at one end, a rod, and a connection member at the other end releasably coupled to a drive source, the device comprising a plurality of equally spaced temperature sensing elements on a central portion of the rod; and a thermometer on the handle, the thermometer having a sensing rod inserted into the handle to be conductive with the temperature sensing elements; wherein after the rotisserie is activated, an internal temperature of a meat impaled by the rod being roasted is sensed by the temperature sensing elements and in response is conveyed to the sensing rod therefrom so as to indicate a temperature reading of the internal temperature of the meat on the thermometer.

The above and other objects, features and advantages of the present invention will become apparent from the following detailed description taken with the accompanying drawings.

DETAILED DESCRIPTION OF THE PREFERRED EMBODIMENTS

Figure 1:
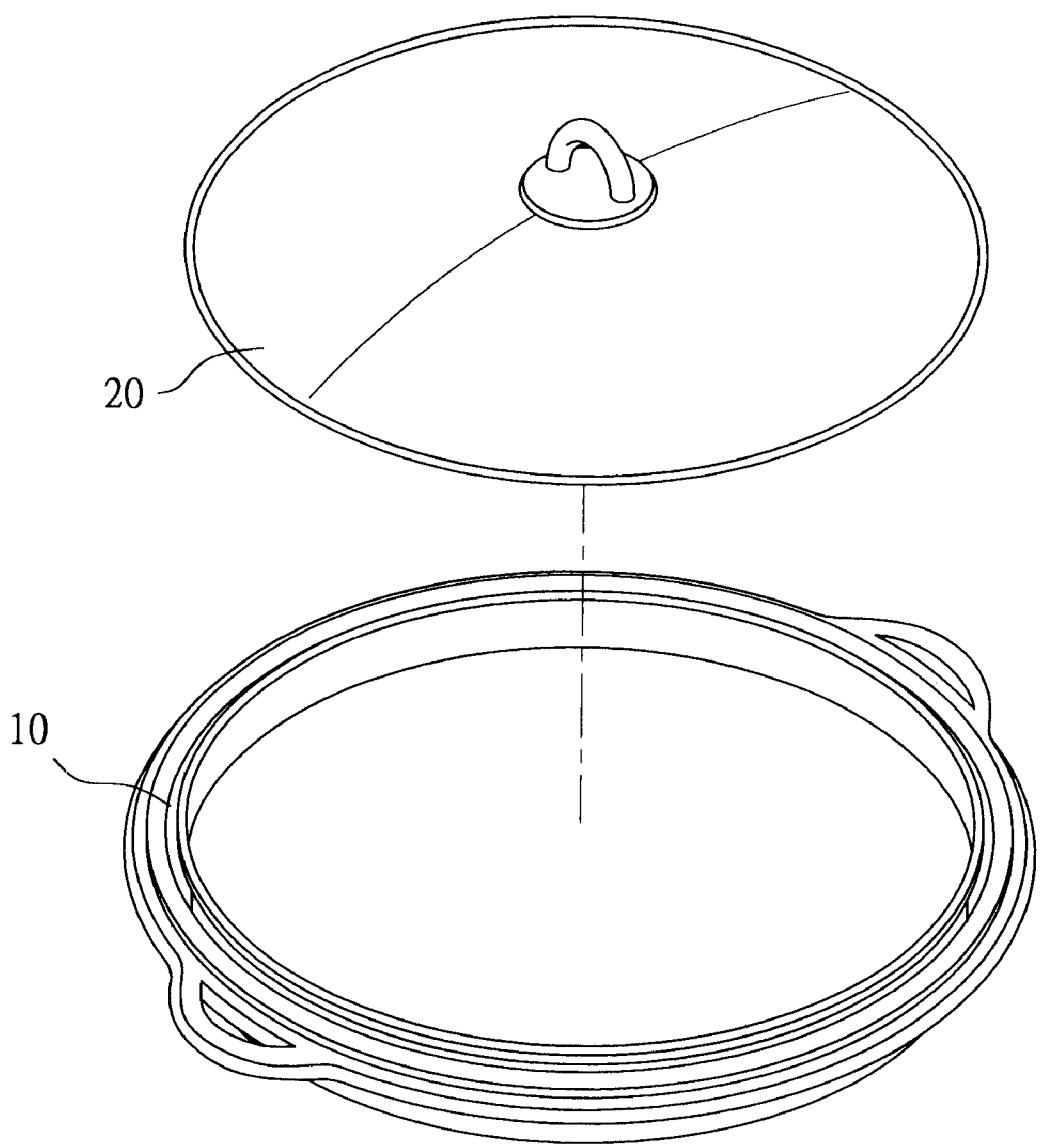
FIG. 1 is a perspective view of a conventional electric roasting pan.
Figure 2:
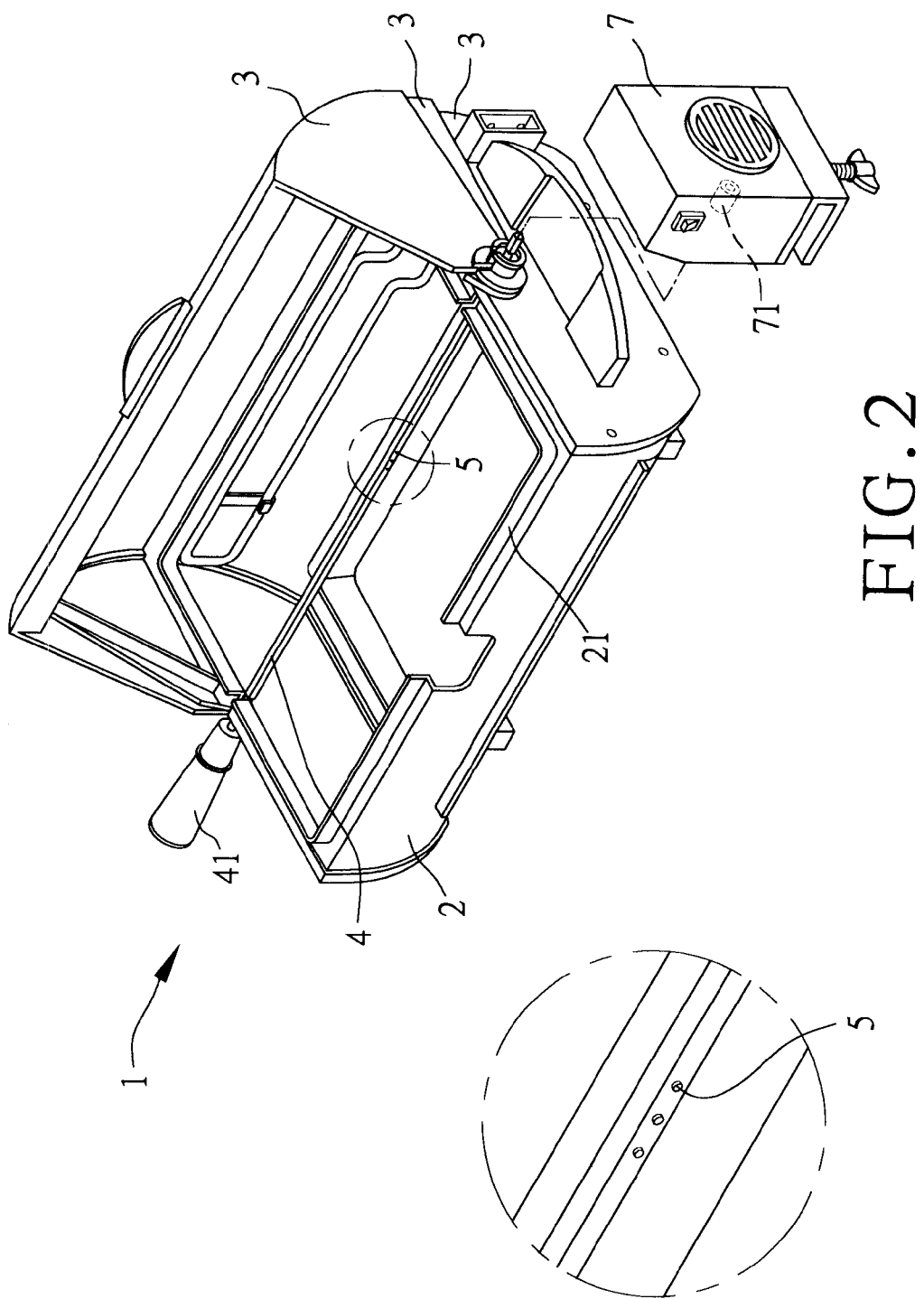
FIG. 2 is an exploded perspective view of a rotisserie constructed according to the invention.
Figure 3:
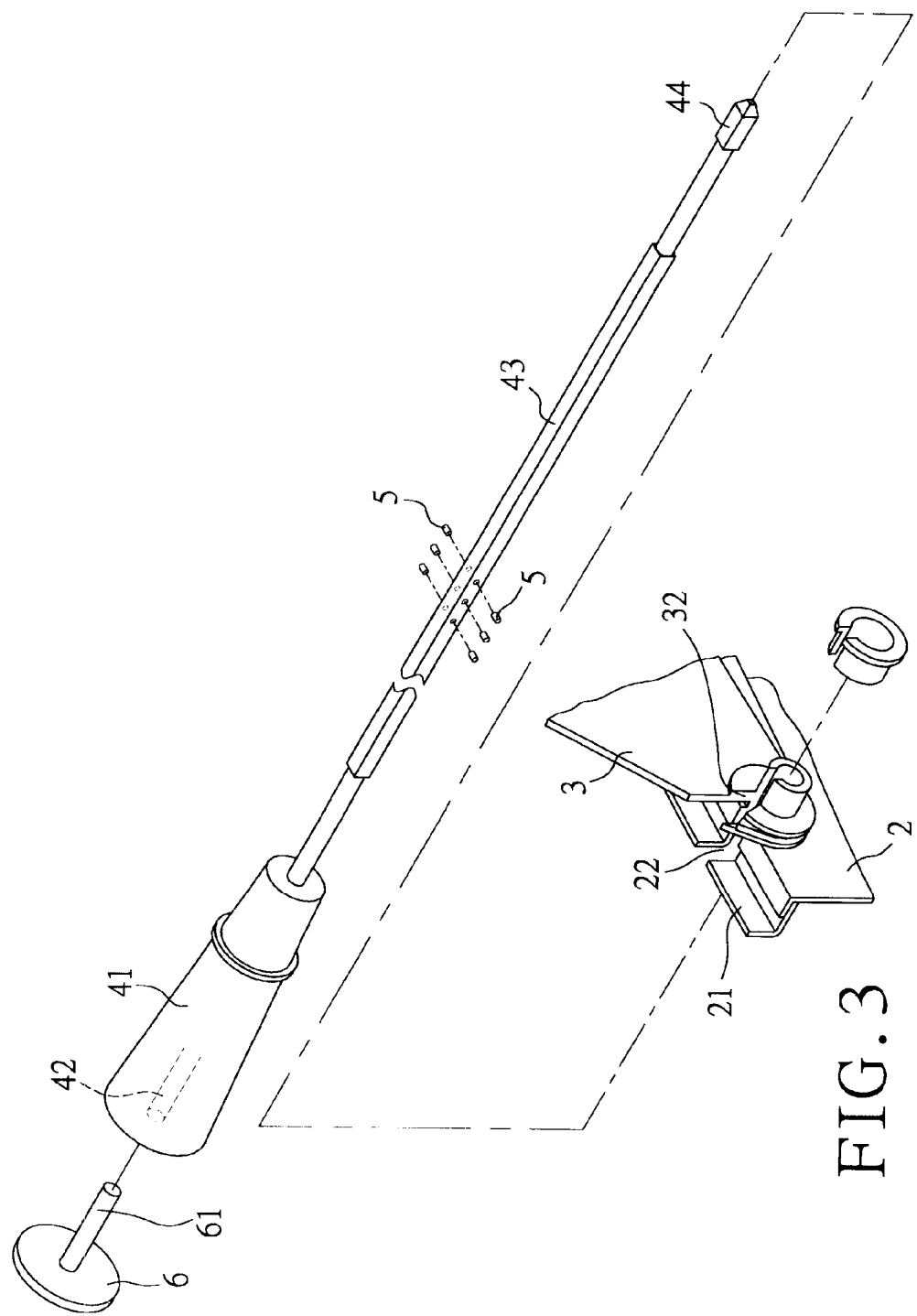
FIG. 3 is an exploded view of spit, temperature measuring arrangement, and a supporting portion of grill section of the rotisserie.
Figure 4:
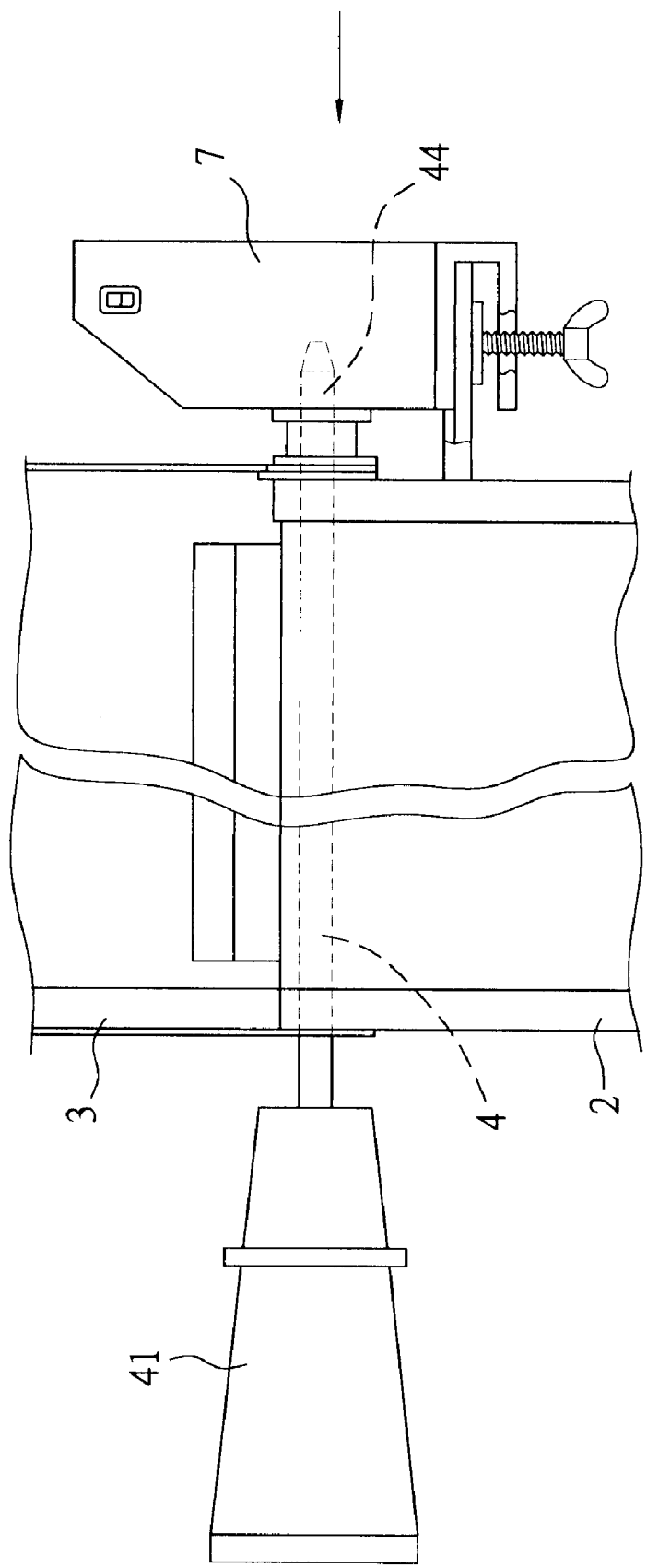
FIG. 4 is a side view schematically showing the assembled spit and motor of the rotisserie.

Referring to FIGS. 2, 3 and 4, there is shown a rotisserie 1 constructed in accordance with the invention comprising a grill section 2, a telescopic lid 3 covered on the grill section 2, a spit 4 rotatably mounted on two grooves 22 at opposite sides of the grill section 2, the spit 4 having a handle 41 at one end outside the grill section 2, a hole 42 in the handle 41, a rod section 43, and a connection member 44 at the other end, a plurality of equally spaced temperature sensing elements 5 mounted on the central portion of the rod section 43, a pin-shaped thermometer 6 having a sensing rod 61 fitted in the hole 42, the sensing rod 61 being conductive with the temperature sensing elements 5, and a motor 7 mounted adjacent a side of the grill section 2 opposite to the handle 41, the motor 7 having a sleeve 71 with the connection member 44 releasbly secured therein.

Figure 5:
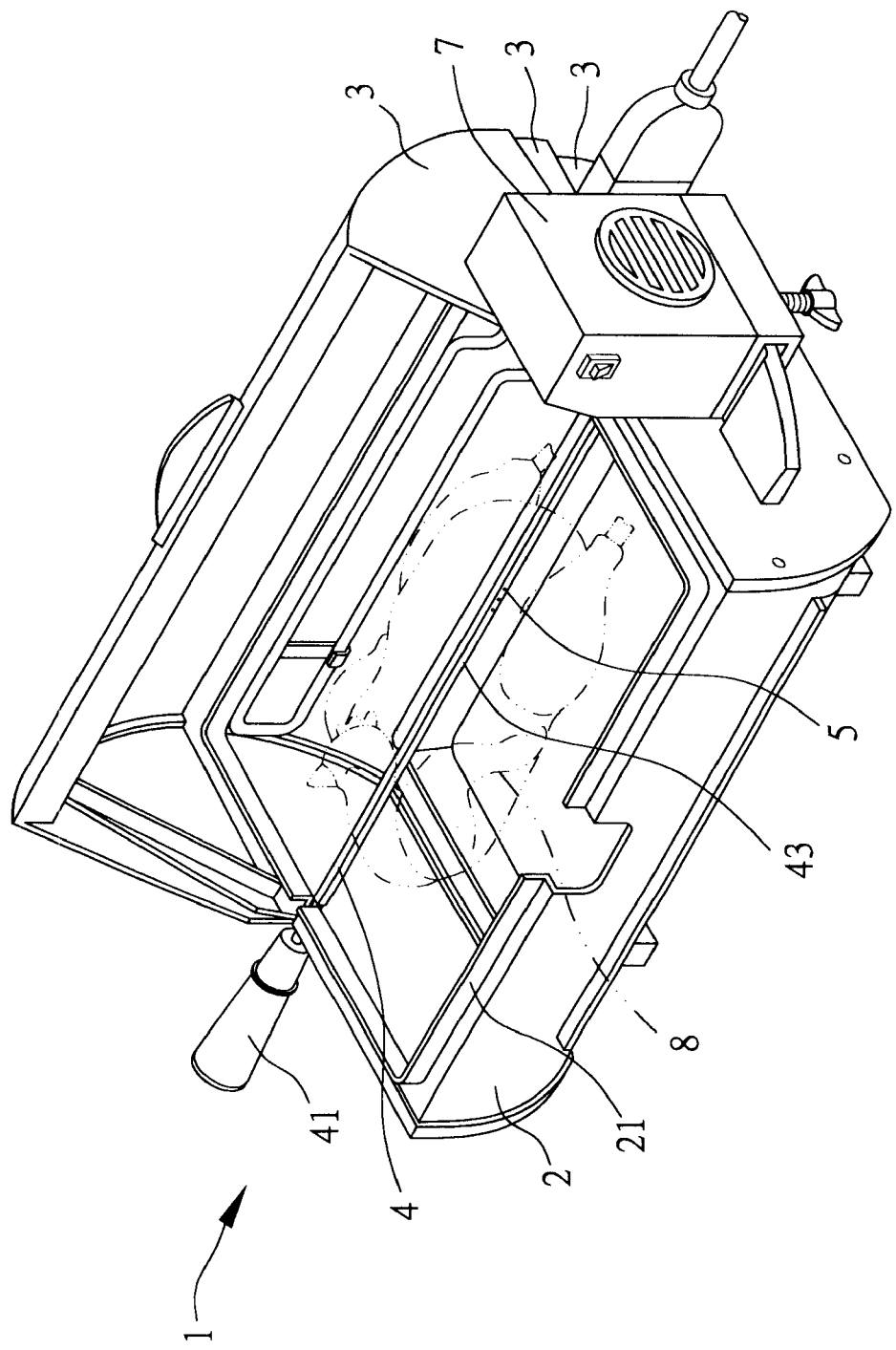
FIG. 5 is a perspective view of the rotisserie with lid open to show an impaled meat to be roasted.
Figure 6:
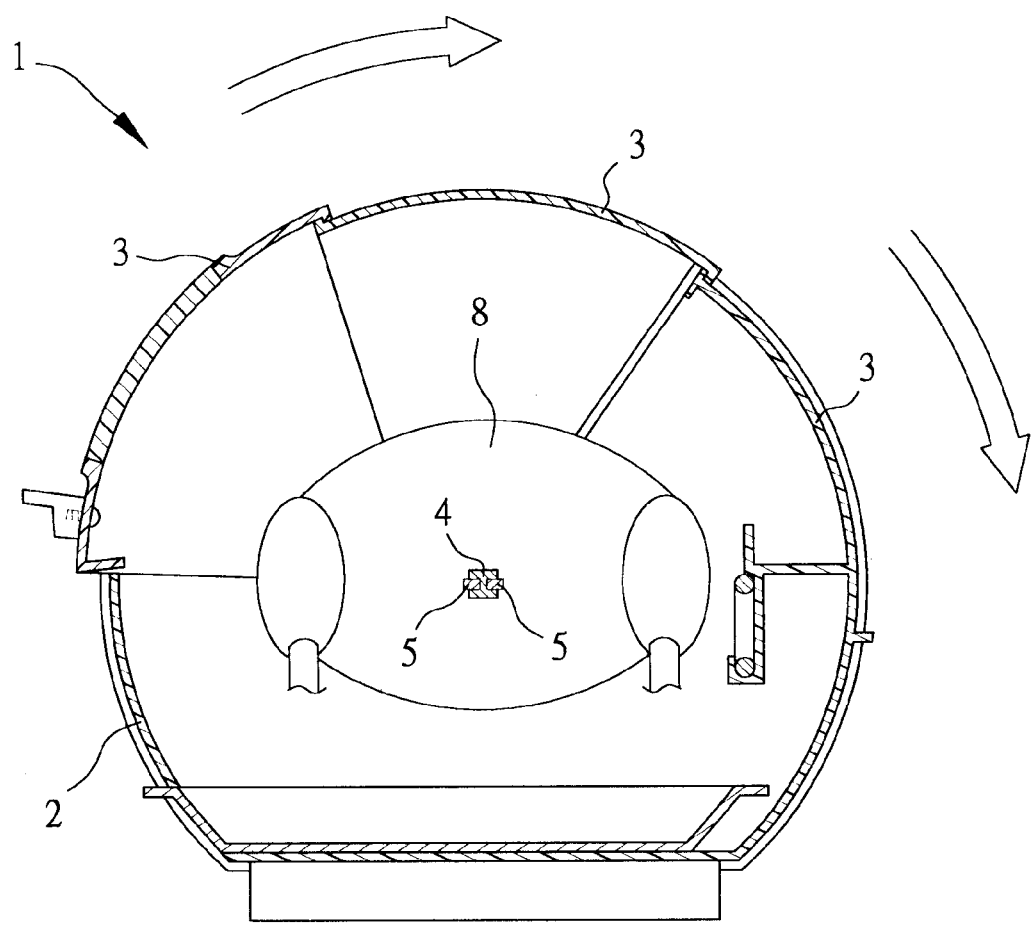
FIG. 6 is a cross-sectional view showing the meat enclosed in the rotisserie.

Referring to FIGS. 5 and 6, an operation of the invention will now be described in detail below. First, open the lid 3 by pivoting one section thereof inside the other. Next, use the rod section 43 to impale a meat 8 prior to put the spit 4 on the grill section 2. Then couple the connection member 44 to sleeve 71. Next, close the lid 3 by pivoting in an opposite direction. Finally, turn on the motor 7 to transmit a rotational movement of a shaft thereof to the spit 4. It is envisaged that the turned meat 8 will be well done after a period of time. In detail, internal temperature of the meat 8 is sensed by the temperature sensing elements 5. The internal temperature of the meat 8 is then conducted from the temperature sensing elements 5 to the sensing rod 61. Thus, a measuring of the internal temperature of the meat 8 is realized as a user can visually observe temperature indicated on the thermometer 6. At this time, the user can determine whether the meat is well done. In other words, the user can precisely know that the meat 8 is well done if temperature of the thermometer 6 has risen to a predetermined value.

While the invention has been described by means of specific embodiments, numerous modifications and variations could be made thereto by those skilled in the art without departing from the scope and spirit of the invention set forth in the claims.

What is claimed is:

1. A device mounted on a rotary spit of a rotisserie, the spit having an external handle at one end, a rod, and a connection member at the other end releasably coupled to a drive source, the device comprising:

a plurality of equally spaced temperature sensing elements on a central portion of the rod; and a thermometer on the handle, the thermometer having a sensing rod inserted into the handle to be conductive with the temperature sensing elements;

wherein after the rotisserie is activated, an internal temperature of a meat impaled by the rod being roasted is sensed by the temperature sensing elements and in response is conveyed to the sensing rod therefrom so as to indicate a temperature reading of the internal temperature of the meat on the thermometer.

* * * * *